United States Patent
Mott

(10) Patent No.: US 7,631,809 B2
(45) Date of Patent: Dec. 15, 2009

(54) ANTENNA FOR COMBINED RFID OPTICAL IMAGER

(75) Inventor: Peter Earl Mott, Baldwinsville, NY (US)

(73) Assignee: JADAK, LLC, North Syracuse, NY (US)

( * ) Notice: Subject to any disclaimer, the term of this patent is extended or adjusted under 35 U.S.C. 154(b) by 206 days.

(21) Appl. No.: 11/627,047

(22) Filed: Jan. 25, 2007

(65) Prior Publication Data

US 2008/0180215 A1 Jul. 31, 2008

(51) Int. Cl.
*G06K 7/00* (2006.01)

(52) U.S. Cl. ........................... 235/440; 235/435

(58) Field of Classification Search ........... 235/440
See application file for complete search history.

(56) References Cited

U.S. PATENT DOCUMENTS

| | | | |
|---|---|---|---|
| 6,839,035 B1 * | 1/2005 | Addonisio et al. | 343/742 |
| 2005/0238204 A1 * | 10/2005 | Tevs et al. | 382/106 |
| 2008/0030343 A1 * | 2/2008 | Raybuck et al. | 340/572.8 |

OTHER PUBLICATIONS

Humpston, Giles "wafer-level packaging boosts yields of chip-on-board image sensors", Solid State Technology, Nov. 2006.*

Usami, M. "An SOI-Based 7.5 μm-Thick 0.15×0.15mm'RFID Chip", IEEE International Solid-State Circuits Conference, Feb. 5-9, 2006.*

Finkenzeller, Klaus "The Manufacture of Transponders and Contactless Smart Cards", RFID Handbook: Fundamentals and Applications in Contactless Smart Cards and Identification (Second Edition), Jul. 21, 2003.*

Humpston, Giles "Wafer-level packaging boosts yields of chip-on-board image sensors", Solid State Technology, Nov. 2006.*

* cited by examiner

*Primary Examiner*—Michael G Lee
*Assistant Examiner*—Laura Gudorf
(74) *Attorney, Agent, or Firm*—David L. Nocilly; Bond Schoeneck & King

(57) ABSTRACT

An antenna for use in connection with a combined RFID reader and optical imager. A printer circuit board having a wire loop positioned thereon and a hole formed therethrough is positioned in combination with an optical imager so that the imaging element of the optical imager may capture images through the hole. In addition, illuminating elements, such as LEDs may be provided on the printed circuit board to provide external or additional illumination of target objects. By positioning the antenna and optical imager in such a manner, the space required to implement optical imaging and RFID capabilities is improved and optical imaging and RFID interrogation may be more easily directed at a single object. In addition, extra illumination may be easily provided for improved imaging.

10 Claims, 5 Drawing Sheets

ANTENNA FOR COMBINED RFID OPTICAL IMAGER

BACKGROUND OF THE INVENTION

1. Field of the Invention

The present invention relates to data collection systems and, more specifically, to an antenna for use in connection with a host controllable module combining radio frequency identification (RFID) and optical imaging.

2. Description of the Related Art

Barcodes are essentially graphic representation of data (alpha, numeric, or both) that is machine-readable. Barcodes encode numbers and letters into different types of symbologies, such as linear codes, two-dimensional codes, and composite codes (a combination of linear and two-dimensional codes). In more recent applications, referred to as digital or optical image capture, an optical device snaps a digital picture of the barcode and software in the imager orients the picture and decodes the barcode(s) contained in the picture.

RFID is a wireless communication technology that utilizes radio waves for automatic identification and data capture of information for the purpose of identifying and tracking objects, people, or even animals. Signals in the radio frequency (RF) range of the electromagnetic spectrum are used to communicate data between a two transceiver devices. An RFID system typically consists of the three main components: a tag, a reader, and the software/firmware for controlling the system. Tags are placed on objects or people and directly or indirectly contain information about the object or person. The reader uses RF energy to interrogate the tag and read the information it contains, or even write data to the tag.

Technologies such as barcode imaging and RFID can play an important role in various fields by automating processes and improving safety and security. For example, the ability to more accurately track objects and instantly provide data about the object is becoming a particularly important tool in the medical field, where automated systems can help improve safety procedures and limit human errors. In one such system, medical samples and prescription medication may often be provided with a barcode to assist with tracking the formulation and delivery of the medication or samples, and proper identification of the patient to whom the medication or samples belong. RFID technology may be used for tracking medical devices to ensure that the right device is available to the correct patient at the correct time, servicing and administering drugs, or to track the location of high-risk devices like implants that may relocate within a patient.

Conventional systems for utilizing barcodes and RFID are often rudimentary, particularly in the medical field. For example, some systems use an array of photo sensors to detect the presence of medical devices. However, the information recognized by these systems is simply the presence of absence of the device or predetermined indicia. As a result, there is no true image data, the systems lack the ability to process images, and the methods used to communicate the results to the host system are rather limited. In addition, it is often not practical or easy to place indicia on devices that, for example, must withstand the temperatures and process of sterilization. Moreover, the process or expense necessary of accurately place indicia or RFID tags on legacy medical devices may outweigh the feasible of using more advanced systems.

Bar code identification systems and RFID systems generally require middleware applications that provide an interface between the readers and the host device or computer. The middleware filters and structures the data read from the tags and integrates it into the host application, which stores the information from the tag or dictates the action to be taken with the information. Middleware and host data management software applications are usually provided by an RFID vendor or by third party applications developers. These systems are not, however, capable of combining the advantages of machine vision and RFID into a modular package that may be easily integrated into existing medical devices or adapted for use in new systems and easily controlled by the user. Instead, they require the integration of multiple systems and the use of sophisticated processing software to accomplish any functions beyond rudimentary barcode identification and RFID interrogation.

Bar code identification systems and RFID systems also generally require multiple, non-corresponding parts. For example, an RFID reader requires an RF antenna capable of interrogating and writing to a remote tag. An optical reader, by comparison requires an optical image capture element, such as a CCD, and an external or internal illumination source. As a result, the available space need to implement either function, not to mention both at once, is significant. In addition, the use of additional illumination for improved imaging also increases the footprint of the system, thereby reducing its application in small device, such as handheld units.

BRIEF SUMMARY OF THE INVENTION

It is therefore a principal object and advantage of the present invention to provide antenna for use in combination with combined RFID and optical imaging devices that saves space.

It is an additional object and advantage of the present invention to provide an antenna for use in combination with combined RFID and optical imaging devices that provides for illumination.

It is a further object and advantage of the present invention to provide a combined RFID and optical imaging system that is more easily targeted at objects to be imaged and interrogated.

In accordance with the foregoing objects and advantages, the present invention provides an antenna that is specially adapted for use in connection with a combined RFID reader and optical imager. A printer circuit board having a wire loop antenna element positioned thereon and a hole formed though an intermediate portion of the circuit board is positioned on a second printed circuit board housing an RFID unit and an optical imager. The imaging element of the optical imager may thus capture images through the hole in the antenna. In addition, illuminating elements, such as LEDs, may be provided on the printed circuit board to provide primary illumination of target objects, or secondary illumination enhancing the on-board illumination provided by the imager. By positioning the antenna and optical imager in such a manner, the space required to implement optical imaging and RFID capabilities is improved and optical imaging and RFID interrogation may be more easily directed at a single object. In addition, extra illumination is provided for improved imaging without sacrificing space.

BRIEF DESCRIPTION OF THE DRAWINGS

The present invention will be more fully understood and appreciated by reading the following Detailed Description in conjunction with the accompanying drawings, in which.

DETAILED DESCRIPTION OF THE INVENTION

Figure 1:
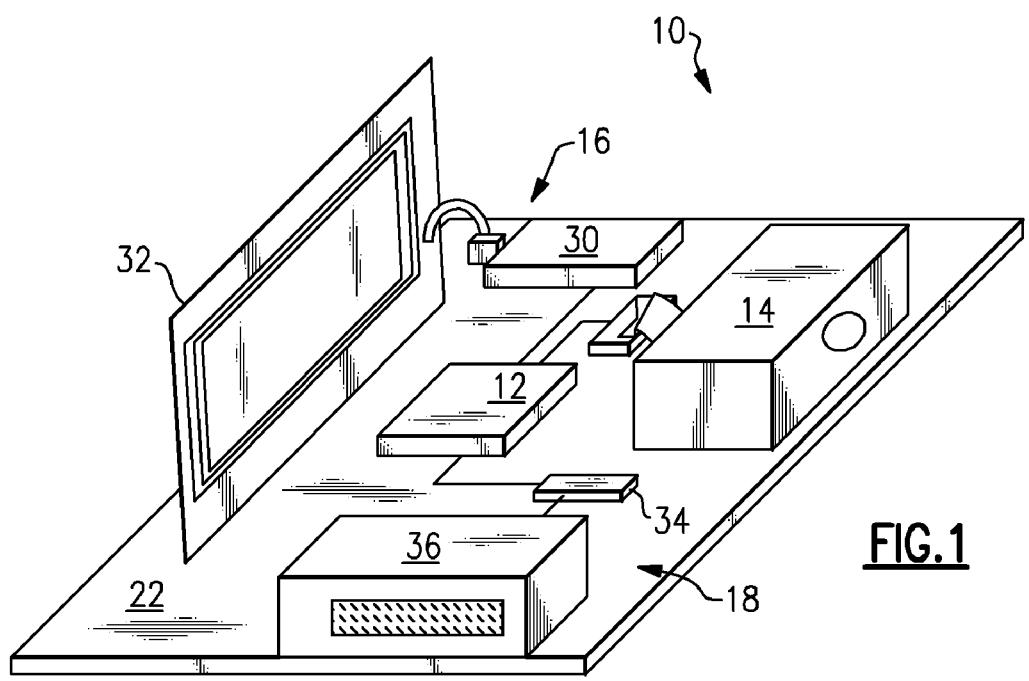
FIG. 1 is a perspective view of a combined RFID and optical imager according to the present invention.

Referring now to the drawings, wherein like reference numerals refer to like parts throughout, there is seen in FIG. 1 a combined RFID and optical image module 10 according to the present invention. Module 10 generally comprises a microcontroller 12 that interconnects a first submodule, such as an optical imager 14, and a second submodule, such as a RFID unit 16, to a single host interface 18. Alternatively, module 10 is capable of interconnecting any variety of data capturing devices as submodules and providing host controllability, including optical imagers, RFID transceivers, lasers, scales, thermometers or temperature probes, etc., in any variety of combinations. Module 10 may be arranged on a single printed circuit board 22 and encased as a single unit or housing. Integration of imager 14 and RFID unit 16 through interface 18 allows for combining control of operation of both submodules, such as RFID reading and barcode, through module 10, as will be explained in detail hereinafter.

Figure 2:
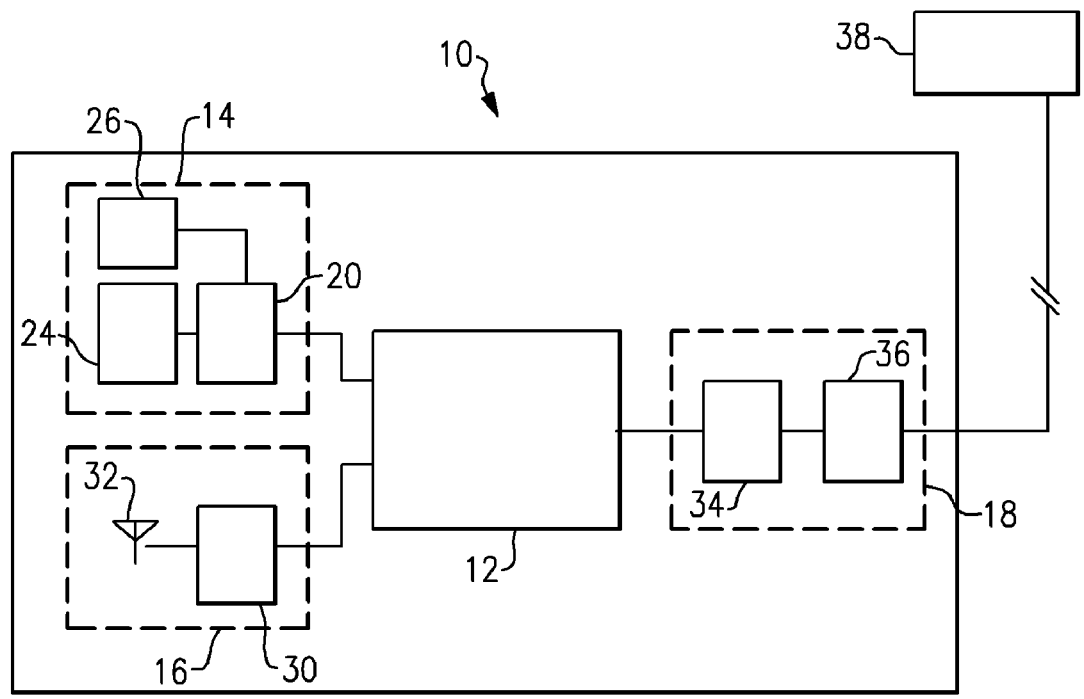
FIG. 2. is a schematic of a combined RFID and optical imager according to the present invention.

Referring to FIG. 2, a first submodule of module 10 is illustrated as an optical imager 14 comprising an image engine 20 having image processing circuitry interconnected to microcontroller 12 for omni-directional optical scanning. Image engine 20 controls an image sensor 24, such as a complementary metal oxide semiconductor (CMOS) image sensor, and is capable of capturing two-dimensional images of 1D linear barcodes, 2D stacked/matrix barcodes, standard optical character recognition (OCR) fonts, Reduced Space Symbology (RSS) barcodes, and postal barcodes, as well as providing image captured images for use in a wide range of applications, such as image and shape recognition, signature capture, image capture, and non-standard optical character recognition. Imager 14 may further include an integrated illumination source 26 connected to engine 20, such as one or more light emitting diodes (LEDs) of various wavelengths, to enhance illumination, operation, and image capture. For example, module 10 may include red LEDs for general illumination and green LEDs for targeting. Imager 14 may comprise, but is not limited to, an IT4X10/80 SR/SF or IT5X10/80 series imager available from Hand Held Products, Inc. of Skaneateles Falls, N.Y. that is capable of scanning and decoding most standard barcodes including linear, stacked linear, matrix, OCR, and postal codes. Specifically, the IT5X10/80 series imager is a CMOS-based decoded output engines that can read 2D codes, and has image capture capabilities sufficient for use with module 10.

Imager 14 obtains an optical image of the field of view and, using preprogrammed algorithms in image engine 20, deciphers the context of the image to determine the presence of any decodable barcodes, linear codes, matrix codes, and the like. Image engine 20 may be programmed to perform other image processing algorithms on the image captured by imager 14, such as shape recognition, match filtering, statistical analysis (e.g., threshold detection), and other high-level processing techniques. Alternatively, a captured image may be processed by microprocessor 12, albeit with a decreased level of performance due to the additional communication time needed to transfer images from image engine 20 to microprocessor 12.

Second submodule of module 10 may comprise an RFID unit 16 including a RFID transceiver 30 and associated RFID antenna 32 supporting standard RFID protocols, such as the TI Tag-it transponder protocol or ISO 15693. For these protocols, transceiver 30 operates at 13.56 MHz, and may comprise a S6700 Multi-Protocol Transceiver IC available from Texas Instruments of Dallas, Tex. Depending on the application, other frequency transceivers may be more appropriate based on target range, power availability, cost, etc. RFID unit 16 may further include a speaker or LED (not shown) for audibly indicating a successful interrogation of a RFID tag.

Antenna 32 is preferably a loop antenna of various sizes and turns implemented on a substrate, such as printed circuit board, and connected to module 10, or a wire loop antenna installed directly onto module 10. Antenna 32 may be positioned remotely, thereby reducing the footprint of module 10 using an external connector, such as a MMCX coaxial connector. RFID transceiver 30 may be programmed to interrogate passive or active tags, process signals received from such tags (e.g., analog to digital conversion), and provide the information from the tags to microcontroller 12 for further processing or transmittal to a host computer via interface 18.

Host interface 18 comprises a host transceiver 34 and a host connector 36 for interconnection to a host device 38. Interface 18 may comprise a conventional RS232 transceiver and associated 12 pin RJ style jack. For example, an ADM202EARN available from Analog Devices, Inc. of Norwood, Mass. is a suitable RS-232/V.28 interface device having compliant levels of electromagnetic emissions and immunity. Alternatively, interface 18 may comprise other conventional buses, such as USB, IEEE 1394, I2C, SPI, or PCMCIA, or other connector styles, such as an FFC style to an embedded host or another module 10. Interface 18 may also comprise a wireless transceiver in lieu of connector 36 for wireless communication to a host computer. A Stewart Connector Systems Inc. SS-641010S-A-NF may serve as connector 36 for mating with a Stewart Connector 937-SP-361010-031 matching connector of a host device. Host interface 18 may also comprise a Molex MX52588 connector. Regardless of the type of connector 36 used, host transceiver 34 is programmed with the applicable protocols for interfacing with a host computer, such as USB, Bluetooth®, and IrDA protocols. Transceiver 34 may also be programmed to support both non-inverted signal sense and inverted signal sense.

Microcontroller 12 comprises a conventional programmable microprocessor having on-chip peripherals, such as central processing unit, Flash EEPROM, RAM, asynchronous serial communications interface modules, serial peripheral interfaces, Inter-IC Buses, timer modules, pulse modulators with fault protection modules, pulse width modulators, analog-to-digital converters, and digital-to-analog converters. Additionally, the inclusion of a PLL circuit allows power consumption and performance to be adjusted to suit operational requirements. In addition to the I/O ports dedicated I/O port bits may be provided. Microcontroller 12 may further include an on-chip bandgap based voltage regulator that generates an internal digital supply voltage from an external supply range. Microcontroller 12 preferably comprises a Motorola MC9S12E128.

The functional integration of imager 14 and RFID unit 16 to interface 18 is accomplished by microcontroller 12, which receives and interprets host commands, and then executes the appropriate functions by driving imager 14 and/or RFID unit 16 accordingly. For example, the operation of imager 14 and RFID unit 16 may be triggered by serial commands sent to module 10 from a host device 38, or by a hardware button communicating directly with connector 36 or through host device 38. Microcontroller 12 may further be programmed to execute the functions otherwise performed by one or more of image engine 20, RFID transceiver 30, and host transceiver 34, thereby reducing the amount of circuitry and hardware required by module 10.

When integrating imager 14 and RFID unit 16, module 10 has three principle operational modes: image scanning using imager 14, tag interrogation using RFID unit 16, an interleaved mode that is a combination thereof, and a simultaneous mode. In imaging-only mode, module 10 will capture images and perform the applicable algorithms, such as barcode deciphering, until a barcode is detected or the device is un-triggered. In RFID-only, module 10 will interrogate until a tag is successfully read or module 10 is un-triggered. In interleaved mode, module 10 toggles between imaging and interrogation according to a predetermined timeout schedule. In simultaneous mode, module 10 causes simultaneous imaging and interrogation. In addition, module 10 may be programmed with timeouts to prevent hang-ups. As module 10 can receive, interpret, and execute host commands, these modes may be controlled by a user from host device 38.

Microcontroller 12 may direct RFID interrogation using RFID unit 16 in at least two modes. RFID unit 16 may operate in a free form mode that reads and writes data as a continuous stream, which is limited only by memory capacity. Once RFID unit 16 is triggered, depending on the mode, data is transmitted from the serial port. Second, RFID unit 16 may operate in block mode, where a user may access individual blocks of information via commands sent through interface 18 and interpreted by microcontroller 12.

External control of module 10 is accomplished by a predefined protocol and set of serial host commands that are sent to module 10 from host device 38. The host commands are received by microcontroller 12, which executes the appropriate steps based on the content of the host command. For example, microcontroller 12 may be programmed to recognize host commands that trigger the activation of imager 14 and/or RFID unit 16. Host commands may also be defined to whether the data obtained from imager 14 and/or RFID unit 16 is stored locally in module 10 or passed through interface 18 to host device 38. Host commands may also be provided that enable the various scanning or imaging modes available from imager 14 and RFID unit 16, control the amount of time that imager 14 and RFID unit 16 will attempt scanning before timing out, direct the reading and writing of image and scan data, and select the location where the data is to be written. With regard to imager 14 and RFID unit 16, commands for opening and closing connections to image engine 20 and RFID transceiver 30, as well as commands that return the status of the connection are useful. For example, a host command received from host device 38 may trigger the capture of barcode or RFID data from imager 14 or RFID unit 16. When the scan is complete, a timeout occurs or triggering is turned off via a second host command, and the appropriate feedback is provided to host device 38. The host commands may be preprogrammed into microprocessor 12 and separately provided to host device 38 as a software package for controlling module 10. In addition, software for editing host commands may be supplied to host device 38 to allow a user to edit, add, or delete commands and the corresponding functionality.

Figure 3:
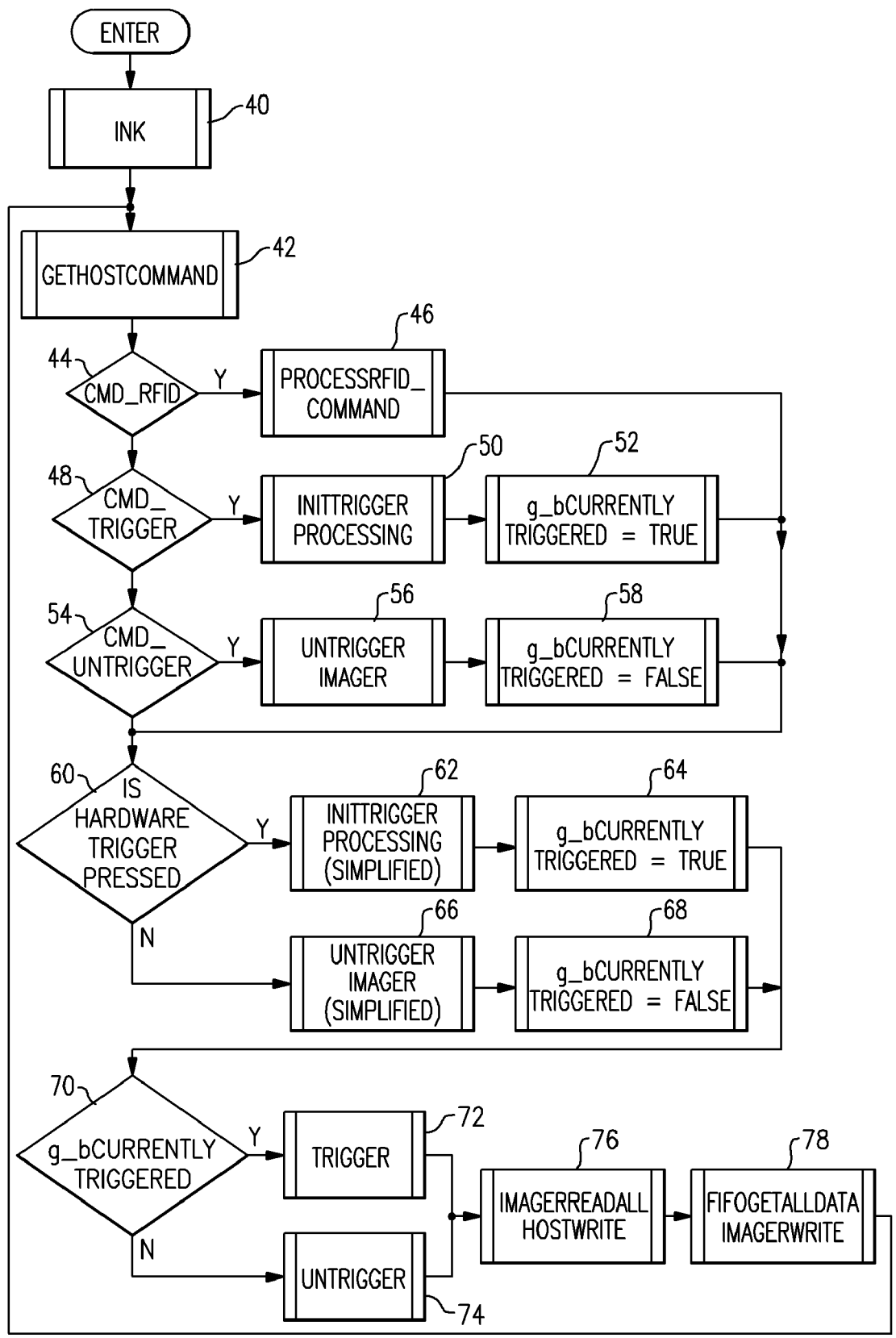
FIG. 3 is a flowchart of main-line processing according to the present invention.

FIG. 3 illustrates an embodiment of main-line host command processing in microprocessor 12 according to the present invention. The specific nomenclature used to define the various routines may be varied by the user or software developer provided that the appropriate functions are performed, and any number of routines and subroutines may be defined and executed in various orders to accomplish image and RFID reading and processing according to the present invention. After initialization 40, microcontroller 12 runs a routine, referred to as GetHostCommand 42, to check whether a host command has been received from host device 38. Upon receipt of a host command, microprocessor 12 checks whether the command is an RFID control command, CMD_RFID 44. If so, the command is processed by routine ProcessRFID_Command 46. If not, a check is performed to see whether the command is a trigger command, CMD_TRIGGER 48. If the command is a trigger command, the appropriate instruction are processed to initiate triggering, InitTriggerProcessing 50 and a variable, referred to as CurrentlyTriggered 52, is assigned the value of TRUE or FALSE depending on whether the selected device has already been triggered. If the command is not a trigger command, a check is performed to see whether the command is an untrigger command, CMD_UNTRIGGER 54. If the command is an untrigger command, the appropriate steps are taken to stop triggering, UnTriggerImager 56, and a variable, CurrentlyTriggered 58, is assigned the value of TRUE or FALSE depending on whether the selected device has already been triggered.

After any of the above processing, microprocessor 12 checks to see whether a hardware trigger has been pressed 60, the triggering processing is performed, InitTriggerProcessing 62, and a variable, referred to as CurrentlyTriggered 64, is assigned the value of TRUE or FALSE depending on whether the selected device has already been triggered. If a hardware trigger has not been pressed 60, the appropriate instruction are processed to stop triggering, UnTriggerImager 66, and a variable, referred to as CurrentlyTriggered 68, is assigned the value of TRUE or FALSE depending on whether the selected device has already been triggered. Finally, microprocessor checks to see whether the CurrentlyTriggered variable is TRUE or FALSE 70, and then calls function Trigger 72 or function UnTrigger 74 as appropriate. Data is then read from imager 14 and written to the host, ImagerReadAllHostWrite 76, and host data that should be routed to imager 14 is written to it, FifoGetAllDataImagerWrite 78.

Figure 4A:
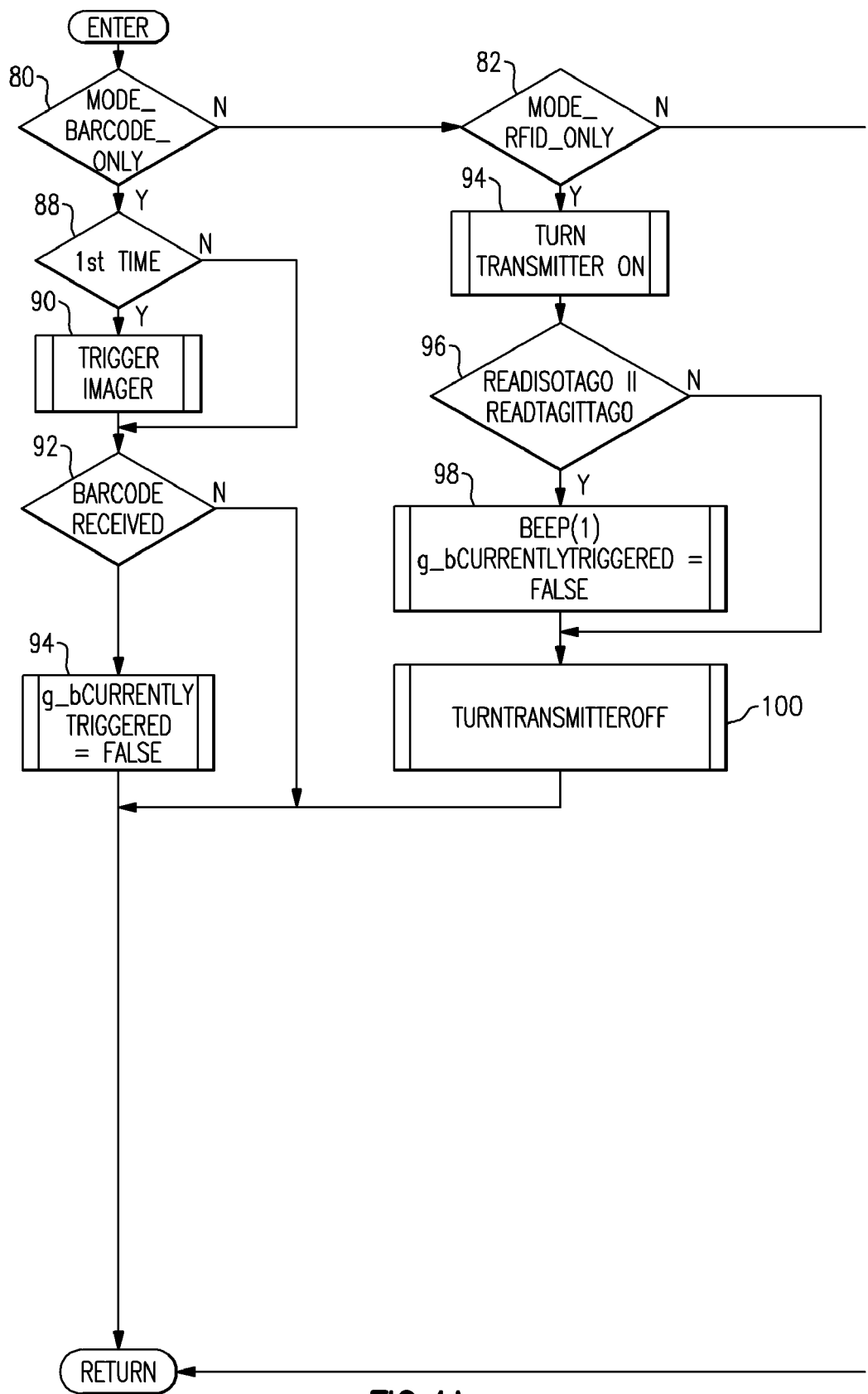
FIG. 4A and FIG. 4B are a flowchart of trigger command processing according to the present invention.
Figure 4B:
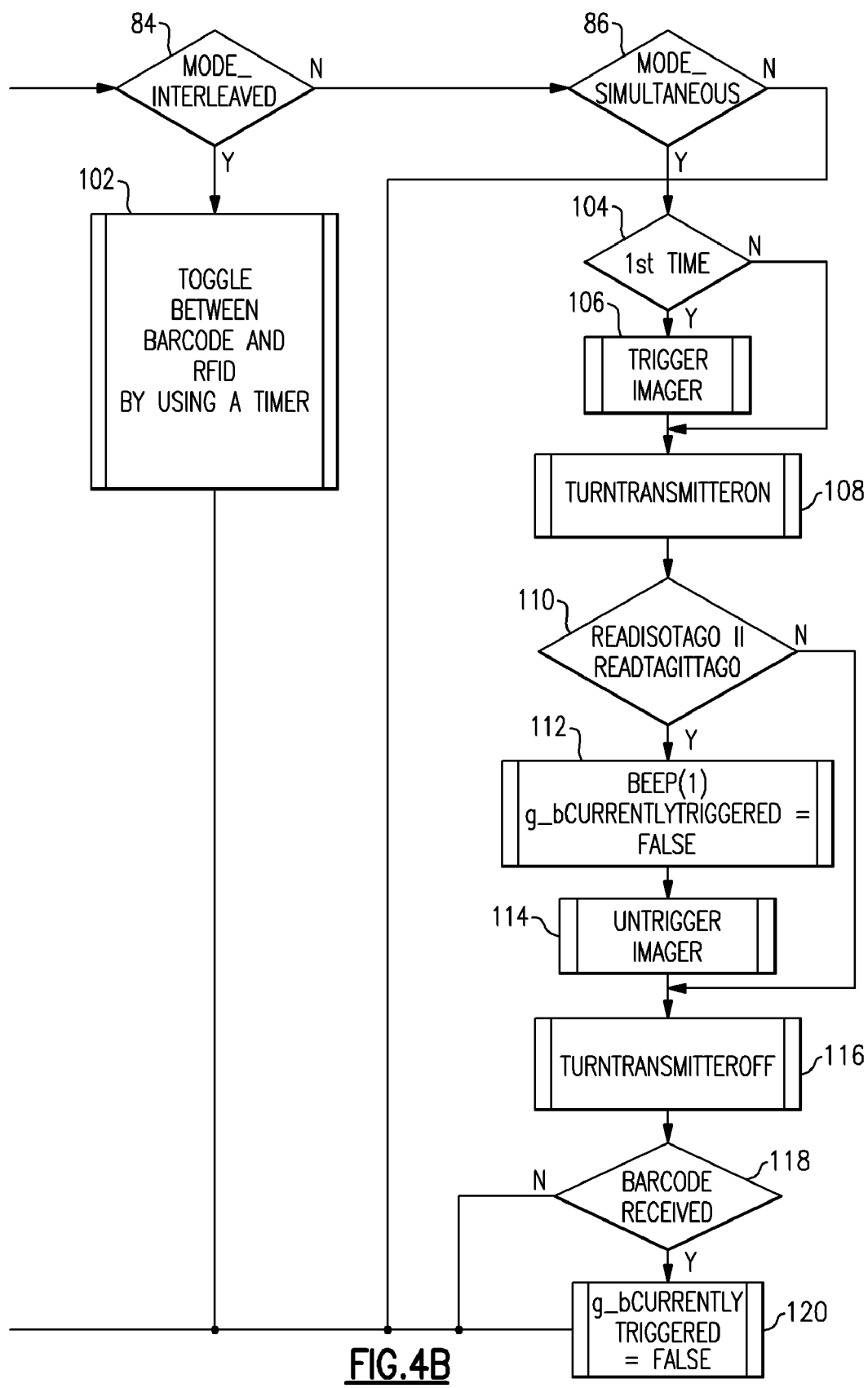

There is seen in FIGS. 4A and 4B, trigger host command processing in microprocessor 12 according to the present invention. Upon receipt of a trigger command, microcontroller 12 first checks to see whether barcode only scanning 80, RFID only scanning 82, interleaved RFID and barcode scanning 84, or simultaneous RFID and image scanning 86 has been previously selected. If bar code only scanning 80 has been selected for the first time 88, and since InitTriggerProcessing 50 has been called, microcontroller 12 triggers imaging 90. If an image is successfully captured and applicable information successfully extracted from the image 92, such as barcode, microcontroller 12 assigns FALSE to the variable CurrentlyTriggered 94. If RFID only scanning 82 has been selected, microcontroller 12 turns the RFID transmitter on 94. If an RFID tag is successfully read 96, an audible tone is sounded and microcontroller 12 sets variable CurrentlyTriggered to FALSE 98. Microcontroller 12 turns transmitter off 100. If interleaved RFID and barcode scanning 84 has been selected, microcontroller 12 toggles operation of imager 14 and RFID unit 16 using a timer 102. If simultaneous RFID and image scanning 86 has been selected, microcontroller 12 checks to see whether the triggering is for the first time 104 and, if so, triggers the imager 106. Transmission from the RFID unit 16 is also turned on 108, and a nearby RFID tag is read 110. If the reading of tag 110 is successful, an audible tone is sounded and variable CurrentlyTriggered is set to FALSE 112. Imager 14 is also untriggered 114 and the transmitter is turned off 116. If the image is successfully processed, e.g., a barcode is received 118, and variable CurrentlyTriggered is set to FALSE 120.

Figure 5:
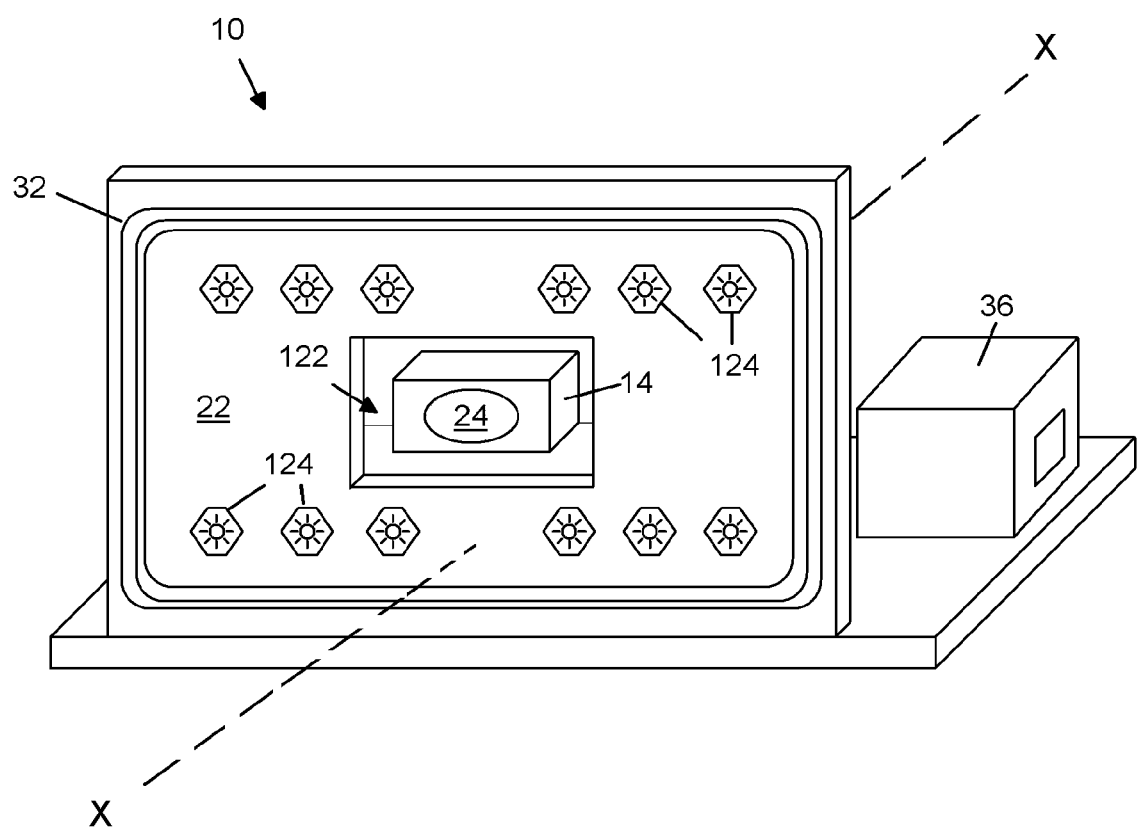
FIG. 5 is a schematic of an embodiment of an antenna according to the present invention.

Referring to FIG. 5, antenna 32 of to the present invention may be configured to be positioned integrally with imager 14 and support additional illumination. In particular, antenna 32 may be formed with a hole 122 formed through its substrate, such as a circuit board. Antenna 32 is positioned on circuit board 22 in front of imager 14 with hole 122 aligned with sensor 24 along axis X-X (and any on-board illumination source 26 of imager 14) such that imager 14 may capture images through antenna 32. Antenna 32 may further include additional illumination sources 124, such as upper and lower banks of LEDs, which are interconnected to engine 20 if imager 14 for appropriate triggering of illumination during imaging processes. As a result, RFID interrogation and optical imaging processes are both primarily directed forwardly along axis X-X.

What is claimed is:

1. A combined RFID reading and optical imaging system, comprising:
    a microcontroller positioned on a first substrate;
    an optical imager positioned on said first substrate and interconnected to said microcontroller;
    an RFID unit positioned on said first substrate and interconnected to said microcontroller;
    a second substrate having an antenna positioned thereon, wherein said second substrate includes a hole formed through an intermediate portion thereof and said antenna is interconnected to said RFID unit, and
    wherein said optical imager is positioned to capture images through said hole.

2. The system of claim 1, further comprising an illumination source positioned on said antenna.

3. The system of claim 2, wherein said illumination source is interconnected to said optical imager.

4. The system of claim 3, wherein said illumination source comprises at least one light emitting diode.

5. The system of claim 3, wherein said illumination source comprises at least one bank of light emitting diodes.

6. The system of claim 4, wherein said imager includes a second, on-board illumination source.

7. The system of claim 1, wherein said antenna comprises at least one wire loop.

8. A method of providing RFID reading and optical imaging from a single module comprising an antenna positioned on a substrate having a hole formed there through, an optical imager, and an RFID unit, said method comprising the steps of:
    positioning an object in proximity to said module; capturing an image of said object through said hole in said substrate using said optical imager; and
    interrogating said object using said RFID unit.

9. The method of claim 8, wherein said module further comprises an illumination source positioned on said antenna.

10. The method of claim 9, further comprising the step of illuminating said object prior to the step of capturing an image of said object.

* * * * *